United States Patent [19]
Oplt

[11] Patent Number: 5,755,197
[45] Date of Patent: May 26, 1998

[54] ROTARY ENGINE

[76] Inventor: Frank G. Oplt, 3150 Golden Orchard Dr., #904, Mississauga, Ontario, Canada, L4Y 3T7

[21] Appl. No.: 639,875

[22] Filed: Apr. 26, 1996

[51] Int. Cl.⁶ ................................................. F02B 53/00
[52] U.S. Cl. ........................ 123/239; 123/237; 123/228
[58] Field of Search ........................... 123/190.17, 228, 123/230, 236, 237, 239; 418/139, 248, 249

[56] References Cited

U.S. PATENT DOCUMENTS

| 904,974 | 11/1908 | Lee . |
| 1,174,818 | 3/1916 | Bubar . |
| 1,671,255 | 5/1928 | Porter ........................... 123/190.17 |
| 1,846,298 | 2/1932 | Alcznauer ........................... 123/228 |
| 2,373,304 | 4/1945 | Garbeth . |
| 3,324,839 | 6/1967 | Erwin . |
| 3,381,670 | 5/1968 | Kincaid . |
| 3,791,352 | 2/1974 | Takacs . |
| 3,823,694 | 7/1974 | Mazzagatti ........................... 123/230 |
| 4,089,305 | 5/1978 | Gregg ........................... 418/139 |
| 4,170,978 | 10/1979 | Eslami . |
| 4,909,208 | 3/1990 | Krisztics . |

FOREIGN PATENT DOCUMENTS 1313842  4/1973  United Kingdom ................ 123/237

*Primary Examiner*—Michael Koczo
*Attorney, Agent, or Firm*—Barrigar & Moss

[57] ABSTRACT

A rotary internal combustion engine is disclosed having a housing with a compression chamber and an expansion chamber which can be separate chambers with separate rotors located therein or a combined chamber with a single double-lobed rotor located therein defining the two chambers. One or more combustion chambers having an inlet and an outlet is located adjacent to the compression and expansion chambers. Rotary valves are located between the combustion chamber inlet and the compression chamber and the combustion chamber outlet and the expansion chamber. Hollow, tubular, piston-like saddle seals are located in the combustion chamber and are urged into sealing engagement with the rotary valves by bias means and pressure in the combustion chamber.

18 Claims, 10 Drawing Sheets

1

ROTARY ENGINE

FIELD OF THE INVENTION

This invention relates to rotary internal combustion engines, and in particular, such engines of the type that have a compression rotor and an expansion rotor and a third intermediate rotor communicating therewith and which forms part of the combustion chamber.

BACKGROUND OF THE INVENTION

Rotary engines have been proposed in the past that have a compression chamber with a compression rotor for the intake and compression of an air/fuel mixture. This compressed air/fuel mixture is fed into a combustion chamber where it is ignited and then passes onto an expansion chamber having a second rotor that is driven by the expanding ignited air/fuel mixture.

Some type of valve mechanism is required to close off the compression chamber prior to the ignition stage and usually also to close off the expansion chamber while the air/fuel mixture is being compressed. For this purpose, a third intermediate or transfer chamber is often employed which communicates with the compression and expansion chambers, and in which a third rotor is located that functions as such a valve. The third rotor usually has radial sector portions which close off ports communicating with the compression and expansion chambers. Examples of this type of rotary engine is shown in the following United States patents: U.S. Pat. No. 904,974 issued to H. Lee; U.S. Pat. No. 2,373,304 issued to G. Garbeth; U.S. Pat. No. 4,170,978 issued to A. Eslami and U.S. Pat. No. 4,909,208 issued to A. Krisztics. A difficulty with these prior art rotary engines, however, is that it is very difficult to produce effective seals around the sector portions of the intermediate rotor. The problem gets worse as the mating parts wear.

In the present invention, one or more fixed combustion chambers is provided with valves at the inlet and outlet of the combustion chambers. Seals are located in the combustion chamber and are urged into engagement with the valves by pressure in the combustion chamber.

SUMMARY OF THE INVENTION

According to one aspect of the invention, there is provided a rotary internal combustion engine comprising a housing defining first and second spaced-apart combustion chambers. Each combustion chamber has an inlet and an outlet. Ignition means communicates with each combustion chamber to ignite a compressed fluid air/fuel mixture located therein. The housing further defines cylindrical compression and expansion chambers located therein adjacent to and communicating respectively with the combustion chamber inlets and outlets. The housing further has intake and exhaust openings spaced from the combustion chamber inlets and outlets and communicating respectively with the compression and expansion chambers. Oval-like rotor means are axially located in the compression and expansion chambers. Reciprocating sealing means are mounted in the housing engaging the rotor means and are located such that rotation of the rotor means permits fluid to be drawn in through the intake opening, be compressed, passed through the combustion chamber from the inlets to the outlets, and pass out through the exhaust opening. A first switching valve is located in the housing in communication with the compression chamber to receive compressed fluid therefrom. This first switching valve includes means for delivering the compressed fluid alternatively between the first and second combustion chambers. A second switching valve is mounted in the housing between the combustion chamber outlets and the expansion chamber. The second switching valve includes means for delivering ignited compressed fluid alternatively from the first and second combustion chamber outlets to the expansion chamber to drive the rotor means. Seals are located in the combustion chambers and means responsive to pressure in the combustion chambers urges the seals into engagement with the switching valves. Also, timing means is coupled to the first and second switching valves and the rotor means for co-ordinating the switching of these valves.

According to another aspect of the invention, there is provided a rotary internal combustion engine comprising a housing defining a combustion chamber having an inlet and an outlet. Ignition means communicates with the combustion chamber to ignite a compressed fluid air/fuel mixture located therein. The housing further defines cylindrical compression and expansion chambers located therein adjacent to and communicating respectively with the combustion chamber inlet and outlet. The housing further has intake and exhaust openings spaced from the combustion chamber inlet and outlet and communicating respectively with the compression and expansion chambers. Oval-like rotor means are axially located in the compression and expansion chambers. Reciprocating sealing means are mounted in the housing engaging the rotor means and located such that rotation of the rotor means permits fluid to be drawn in through the intake opening, be compressed, pass through the combustion chamber from the inlet to the outlet thereof, and pass out through the exhaust opening. A first valve member is located in the housing between the compression chamber and the combustion chamber inlet. A second valve member is located in the housing between the combustion chamber outlet and the expansion chamber. Hollow piston seals are located in the combustion chamber engaging the first and second valve members and being urged into engagement with the valve members by pressure in the combustion chamber. Also, timing means is coupled between the valve members and the rotor means for sequentially opening and closing the valve members upon rotation of the rotor means.

BRIEF DESCRIPTION OF THE DRAWINGS

Preferred embodiments of the invention will now be described, by way of example, with reference to the accompanying drawings, in which.

DETAILED DESCRIPTION OF THE PREFERRED EMBODIMENT

Figure 1:
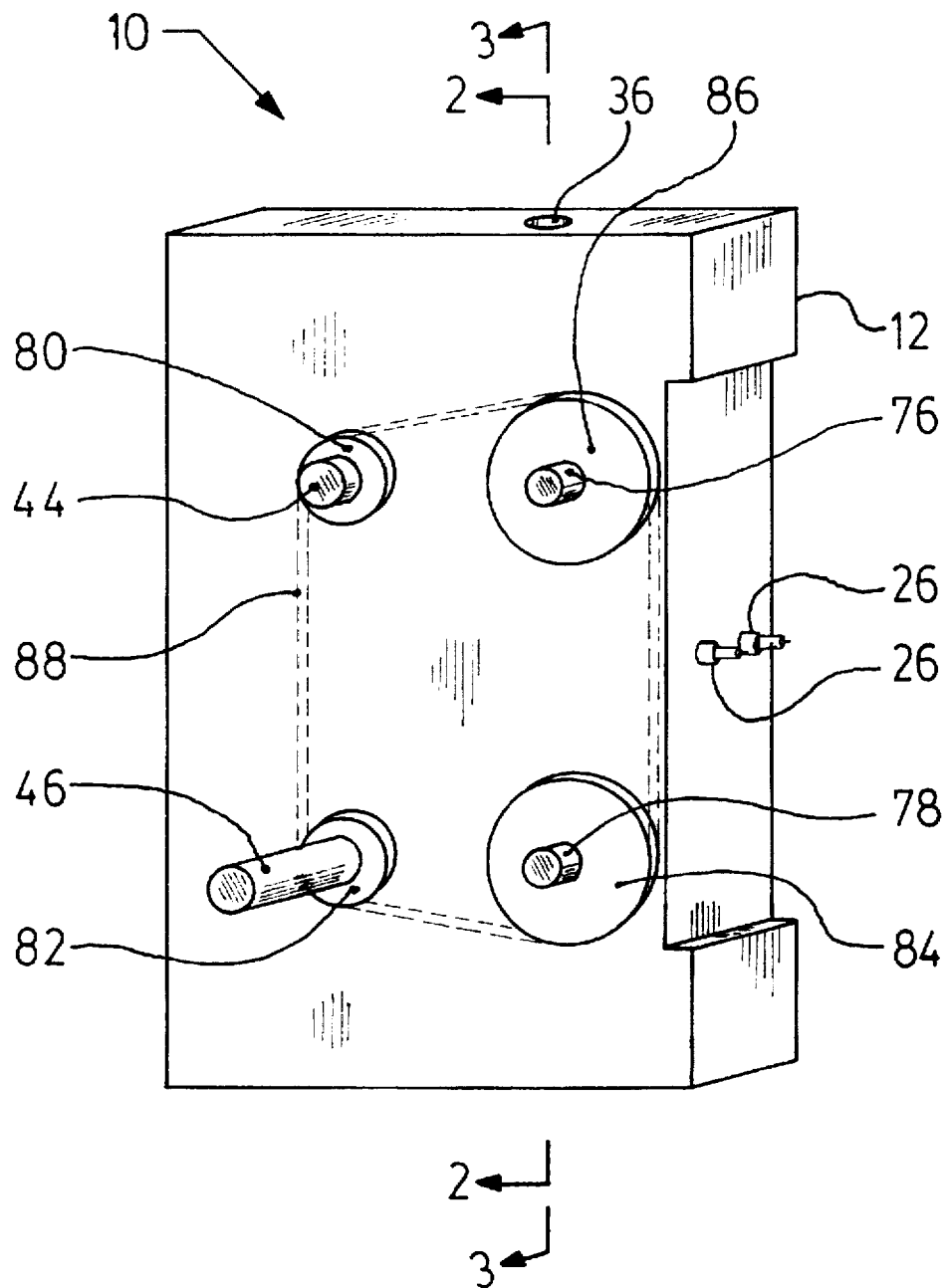
FIG. 1 is a perspective view of a preferred embodiment of a rotary engine having dual rotors according to the present invention.

Referring firstly to FIGS. 1 to 5, a preferred embodiment of a rotary engine according to the present invention is generally indicated in FIG. 1 by reference numeral 10. Engine 10 has a housing 12 defining first and second spaced-apart combustion chambers 14, 16. Combustion chamber 14 has a inlet 18 and an outlet 20 and combustion chamber 16 has an inlet 22 and an outlet 24. A spark plug 26 forms spark ignition means communicating with each combustion chamber 14, 16 to ignite a compressed fluid air/fuel mixture located in the combustion chambers.

Figure 3:
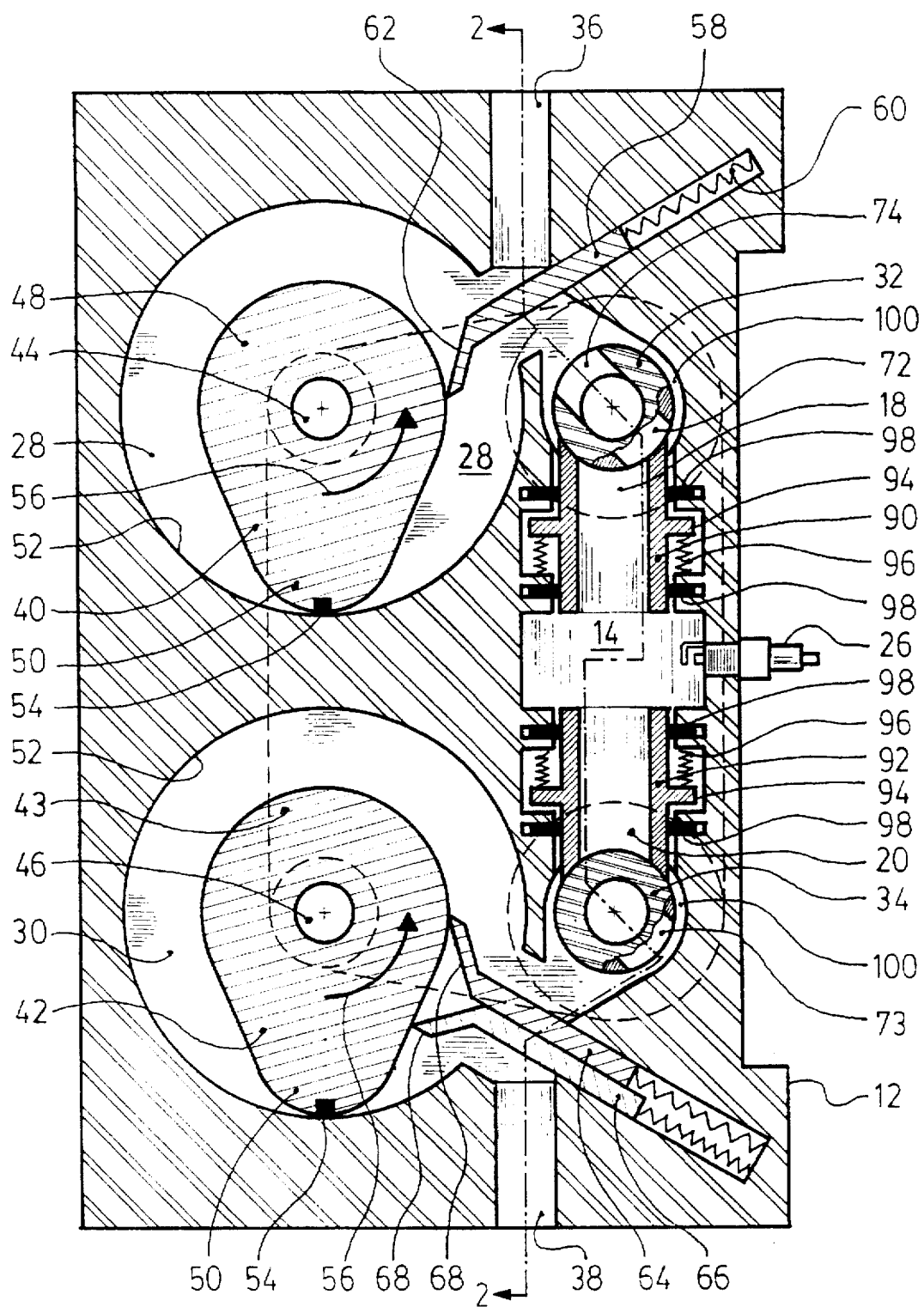
FIG. 3 is a partial sectional view taken generally along lines 3—3 of FIG. 1, and more specifically along chain-dotted line 3—3 of FIG. 2, and showing one of the combustion chambers being pressurized with the air/fuel mixture.
Figure 4:
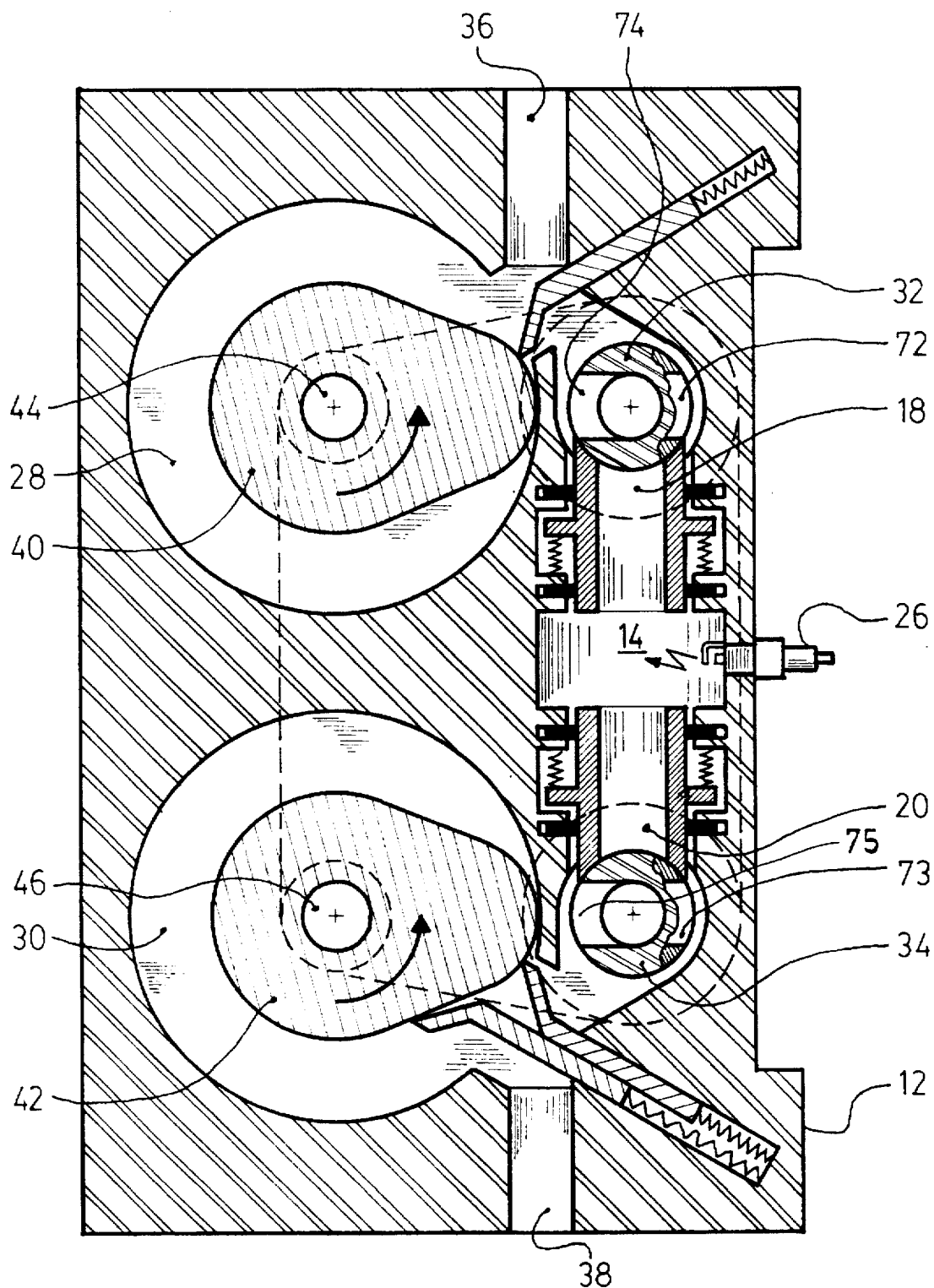
FIG. 4 is a partial sectional view similar to FIG. 3, but showing the engine advanced to the point of ignition.
Figure 5:
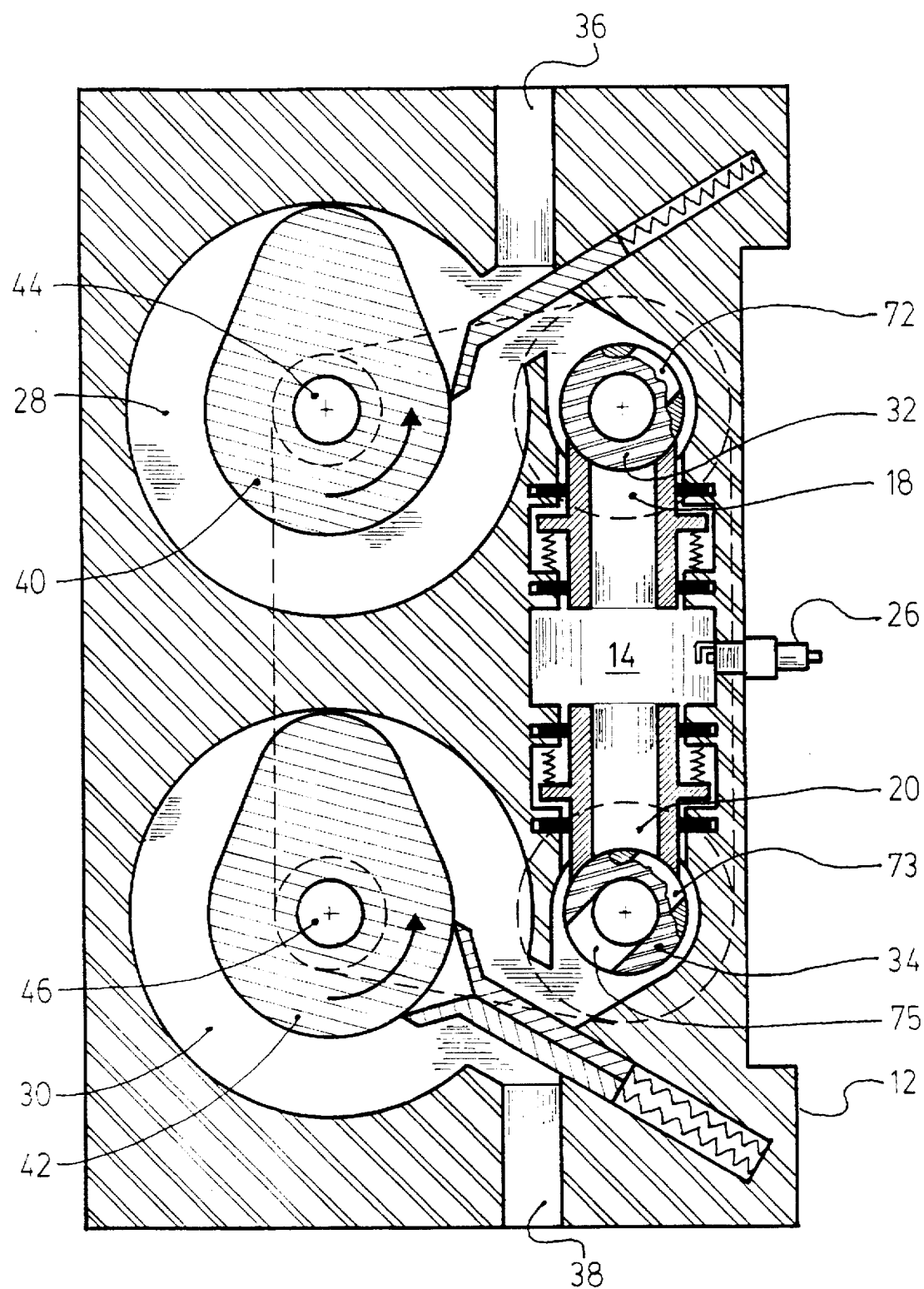
FIG. 5 is a partial sectional view similar to FIGS. 3 and 4 showing the engine further advanced to the expansion stage.
Figure 6:
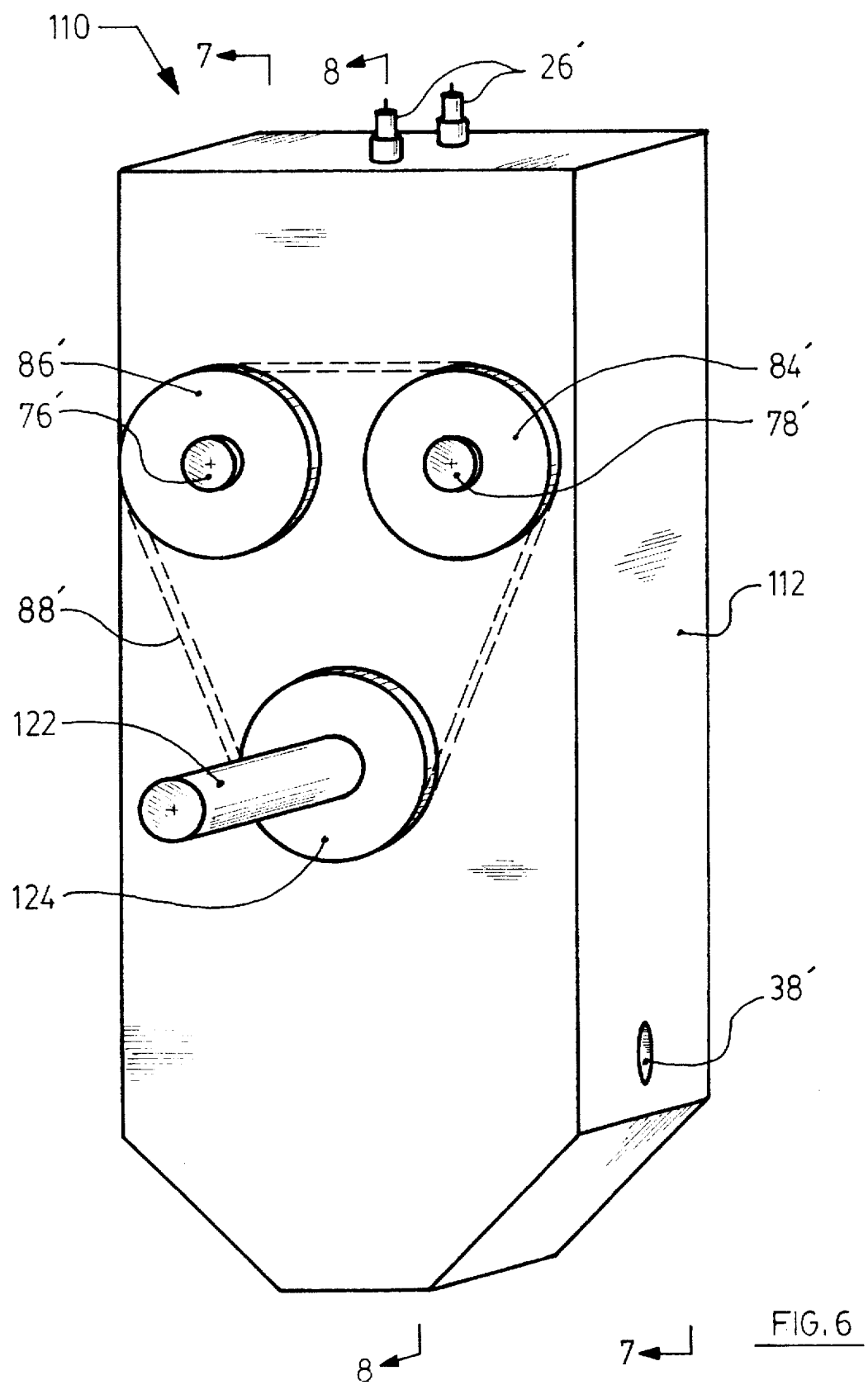
FIG. 6 is a perspective view of another preferred embodiment of the invention having a single rotor.
Figure 7:
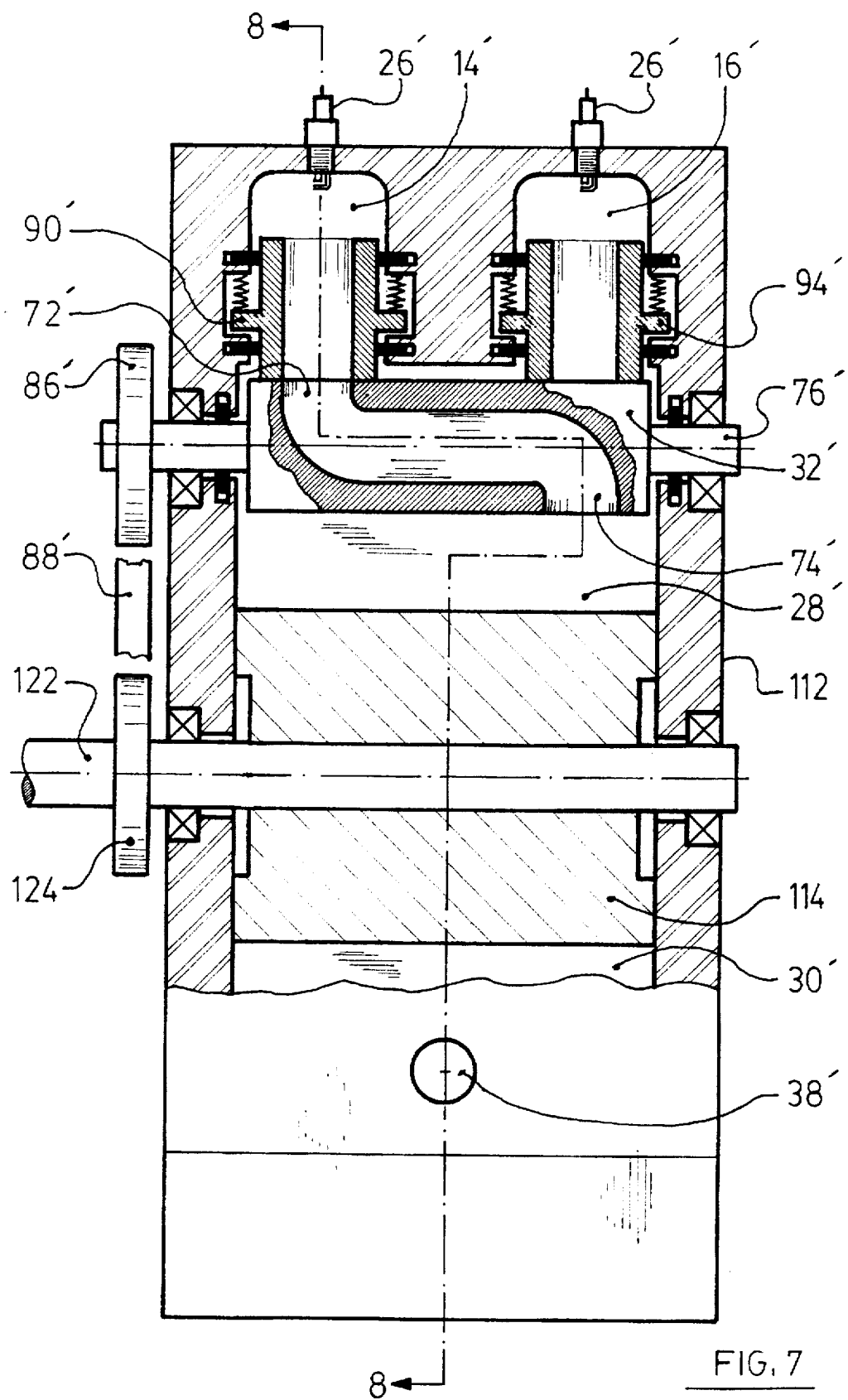
FIG. 7 is a partial sectional view taken generally along lines 7—7 of FIG. 6, and more specifically along chain-dotted line 7—7 of FIG. 8.
Figure 8:
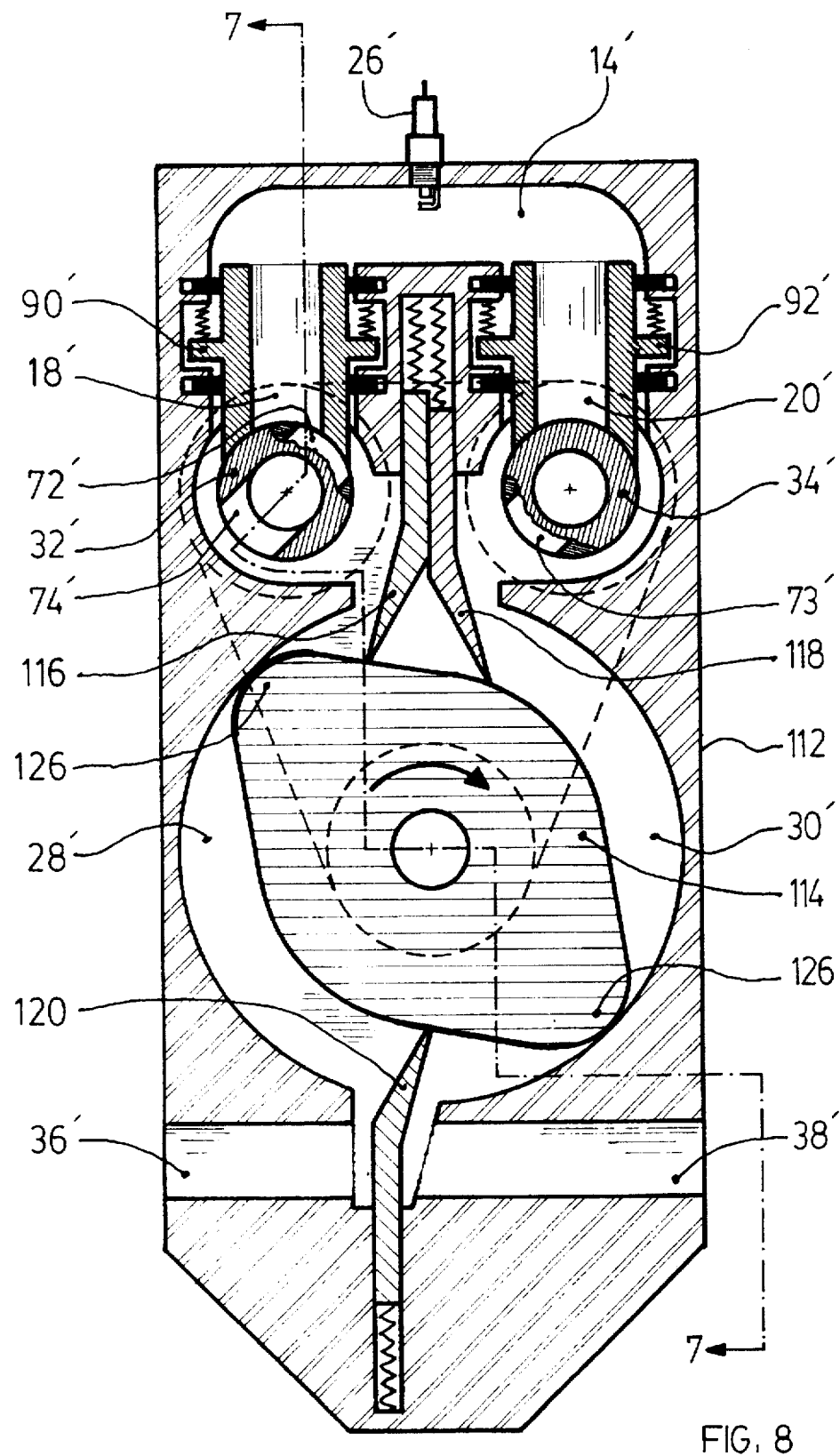
FIG. 8 is a partial sectional view taken generally along lines 8—8 of FIG. 6, and more specifically along chain-dotted line 8—8 of FIG. 7, and showing one of the combustion chambers being charged with the air/fuel mixture.

As seen best in FIGS. 3 to 5, housing 12 includes a cylindrical compression chamber 28 and a cylindrical expansion chamber 30. Compression chamber 28 communicates through a switching valve or valve member 32 with combustion chamber inlets 18, 22. Similarly, expansion chamber 30 communicates through a switching valve or valve member 34 with combustion chamber outlets 20, 24, as will be described in more detail below.

Housing 12 also has an intake opening 36 communicating with compression chamber 28 and an exhaust opening 38 communicating with expansion chamber 30. An oval-like or cam-like compression rotor 40 is axially located in compression chamber 28, and a similar oval-like or cam-like expansion rotor 42 is axially located in expansion chamber 30. Compression rotor 40 is mounted on a driven shaft 44 and expansion rotor 42 is mounted on a drive or output shaft 46. Rotors 40, 42 have a central portion 48 which is circular in cross section and an extended or semi-elliptical or semi-oval portion 50 which slidably engages or sweeps the inside surfaces 52 of compression and expansion chambers 28, 30. Extended portions 50 can be provided with sweeping cam tips or sliding seals 54 as indicated in FIG. 3. Compression and expansion chambers 28, 30 are cylindrical and rotors 40, 42 are axially located in these chambers to rotate about shafts 44, 46 in the direction of arrows 56. Suitable end seals (not shown) are provided in the end faces or upright sidewalls of rotors 40, 42 bearing against the adjacent upright walls of housing 12.

A reciprocating seal 58 is urged into engagement with compression rotor 40 by a spring or other bias means 60. Seal 58 includes an offset distal end portion 62 which is obliquely disposed such that pressure in the compression chamber 28 upstream or at the leading surface of rotor 40 urges end portion 62 into further engagement with rotor 40 to improve the seal therebetween. Also, vacuum in compression chamber 28 downstream or at the trailing surface of rotor 40 assists in making the seal between end portion 62 and rotor 40.

Back-to-back reciprocating seals 64, 66 are associated with expansion rotor 42. Seals 64, 66 have distal end portions 68 that diverge outwardly again to improve a seal against rotor 42 caused by pressure in expansion chamber 30.

Figure 2:
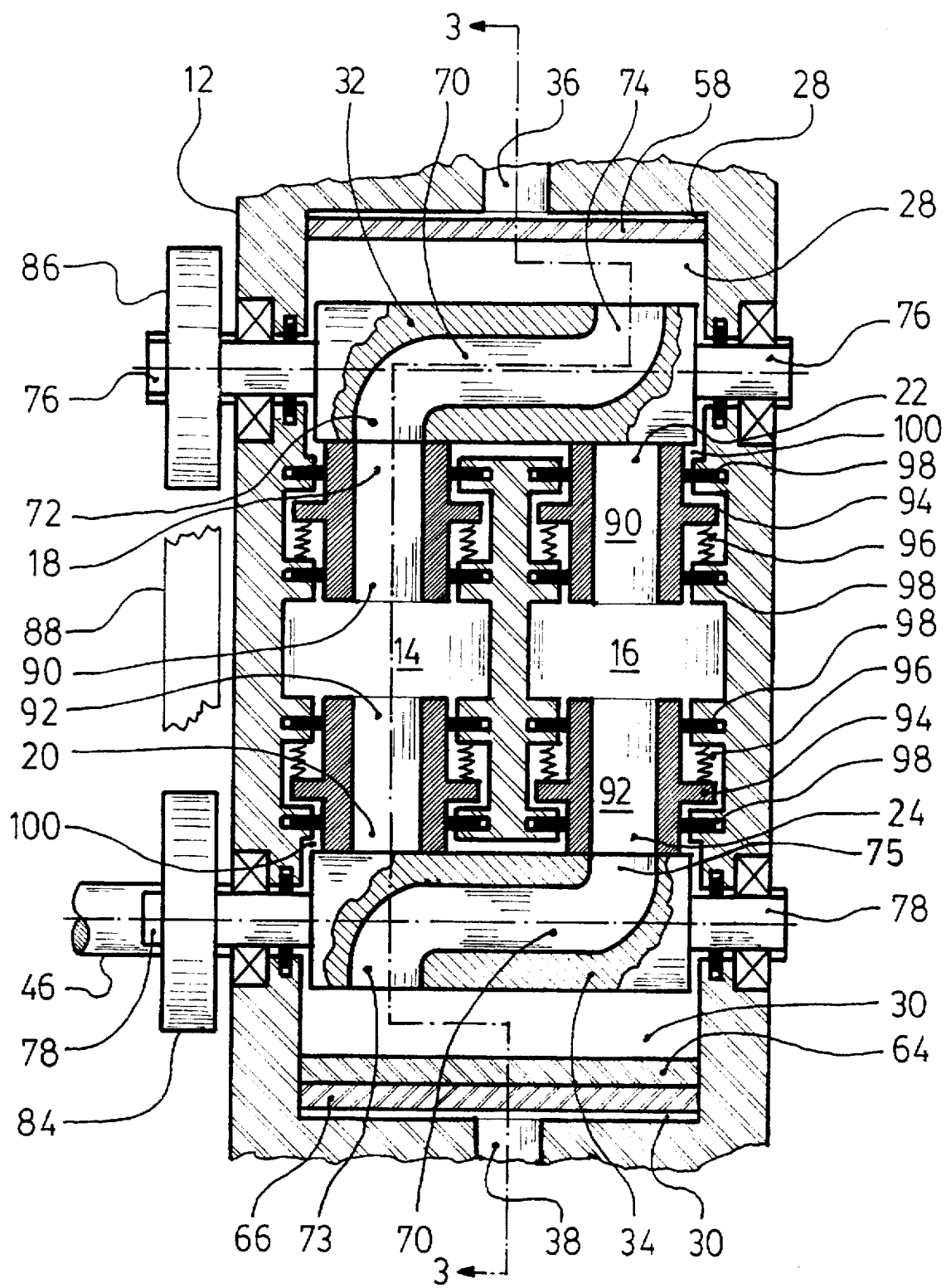
FIG. 2 is a partial sectional view taken generally along lines 2—2 of FIG. 1 and more specifically along chain-dotted line 2—2 of FIG. 3.

As seen best in FIG. 2, valve members 32, 34 are in the form of cylindrical rotating shafts or cylinders having a central, S-shaped passage or transverse opening 70 therethrough defining first and second, spaced-apart, opposed ports 72, 74 in valve member 32 and 73, 75 in valve member 34. Valve members 32, 34 are mounted for rotation on driven shafts 76, 78. Upon rotation of shafts 76, 78, first ports 72, 73 intermittently communicate with inlet 18 and outlet 20 of first combustion chamber 14. Similarly, second ports 74, 75 intermittently communicate with the respective inlet 22 and outlet 24 of second combustion chamber 16, as will be described further below.

Referring again to FIG. 1, the rotation and timing of rotors 40, 42 and switching valves 32, 34 is effected by a drive train comprising gears or sprockets 80, 82, 84 and 86 coupled together by a timing belt or chain 88, so that the rotors 40, 42 and valve members 32, 34 rotate in the same direction. Rotors 40, 42 rotate at twice the speed of valve members 32, 34, or in other words, the gear ratio between gears or sprockets 84, 86 and 80, 82 is two to one.

Referring again to FIGS. 2 and 3, tubular, sliding, hollow piston, saddle seals 90, 92 are located in first and second combustion chambers 14, 16 to engage the respective switching valve 32, 34 or at least the rotating cylindrical portions of these valves. Seals 90, 92 are referred to as saddle seals because the ends thereof that engage valve members 32, 34 would be shaped like a saddle as a result of two cylinders meeting at right angles as will be appreciated by those skilled in the art. Seals 90, 92 have annular flanges 94 and coil springs or other bias means 96 urge seals 90, 92 into engagement with valve members 32, 34. Ring seals 98 are also provided to seal saddle seals 90, 92 against housing 12, and to isolate the bias means 96 from the gases in engine 10.

As seen best in FIG. 3, the cylindrical portion of switching valves 32, 34 is located in an opening or cavity 100 in housing 12 that is of larger diameter than valves 32, 34. This permits fluid to flow around the exterior of valve members 32, 34 and enter ports 72, 73, 74 and 75 as discussed below in connection with the operation of rotary engine 10. Also, because the ends of saddle seals 90, 92 in contact with valve members 30, 32 extend into or are in communication with cavity 100, this causes a pressure differential across saddle seals 90, 92 when the fuel in combustion chambers 14, 16 is ignited, thus further urging the saddle seals into engagement with the valve members by the pressure inside combustion chambers 14, 16.

Referring next to FIGS. 2 to 5, the operation of rotary engine 10 will now be described. As seen in FIG. 3, as rotor 40 rotates in the direction of arrow 56, an air/fuel mixture is drawn in through intake opening 36 behind rotor 40 and the air/fuel mixture previously drawn in and now ahead of rotor 40 is being compressed and forced into port 74 of valve member 32. The air/fuel mixture goes through this valve member 32 and out through port 72 into combustion chamber 14. The opposite end of combustion chamber 14 is blocked by valve member 34, thus combustion chamber 14 is being charged or filled with the compressed air/fuel mixture. The rotation of rotors 40, 42 and valve members 32, 34 continues until the position shown in FIG. 4 is reached, at which time spark plug 26 fires. As the rotation continues, port 73 of valve member 34 comes into communication with combustion chamber 14, and the expanding gases of the ignited air/fuel mixture now pass through valve member 34 and out of port 75 and into expansion chamber 30 to drive rotor 42. It will be noted at this point that valve member 32 blocks the inlet 18 of combustion chamber 14. However, port 72 is now in communication with compression chamber 28, and the air/fuel mixture being compressed therein is now passing through valve member 32 to exit through valve port 74 and enter combustion chamber 16. At the same time, the outlet end of combustion chamber 16 is being blocked by valve member 34. It will be appreciated, therefore, that switching valve 32 delivers the compressed air/fuel mixture alternatively between the first and second combustion chambers 14, 16, and second switching valve 34 delivers the ignited compressed fluid, which is now expanding, alternatively from the first and second combustion chambers 14, 16 into expansion chamber 30 to drive rotor 42. It will also be appreciated that the fluid, being the compressed air/fuel mixture or the expanding combustion gases, passes alternatively in one direction through valve members 32, 34 when these valve members are in communication with one of the combustion chambers, and in the opposite direction when these valve members are in communication with the other of the combustion chambers. In other words, when one of the ports of a valve member is in communication with a combustion chamber, the other of said ports is in communication with the respective compression or expansion chamber. This causes fluid to flow through a valve member in one direction, and when the other port of the valve member is in communication with the combustion chamber, flow goes through the valve member in the opposite direction.

In the embodiment shown in FIGS. 1 to 5, the size or volume of compression chamber 28 is shown to be the same as the size or volume of expansion chamber 30. However, these chambers could be different sizes. For example, if the compression chamber 28 is larger than the expansion chamber, super charging of the expansion chamber would result. If the compression chamber is smaller than the expansion chamber, a Miller cycle effect would result, as will be appreciated by those skilled in the art.

Referring next to FIGS. 6 to 10, a second preferred embodiment of a rotary engine according to the present invention is generally indicated by reference numeral 110. In FIG. 6 to 10, primed reference numerals have been used to indicate similar parts to the embodiment shown in FIGS. 1 to 5. In rotary engine 110, the compression and expansion chambers are formed as portions of a single common cylindrical chamber inside housing 112. A double ended or double-lobed rotor 114 divides this chamber into a compression chamber portion 28' (see FIG. 8), and an expansion chamber portion 30'. A first, back-to-back reciprocating pair of seals 116, 118 is located between the inlet 18' and the outlet 20' of combustion chamber 14' (and also for combustion chamber 16'). A second, single reciprocating seal 120 is located between the intake and exhaust openings 36', 38'. Rotor 114 is mounted on a drive shaft 122. A gear or sprocket 124 mounted on shaft 122 drives gears or sprockets 84', 86' and thus valve members 32', 34'. In this embodiment, all three gears or sprockets 84', 86' and 124 are the same size, so that the rotor 114 and switching valves 32', 34' turn at the same speed or have a one-to-one gear ratio.

Figure 9:
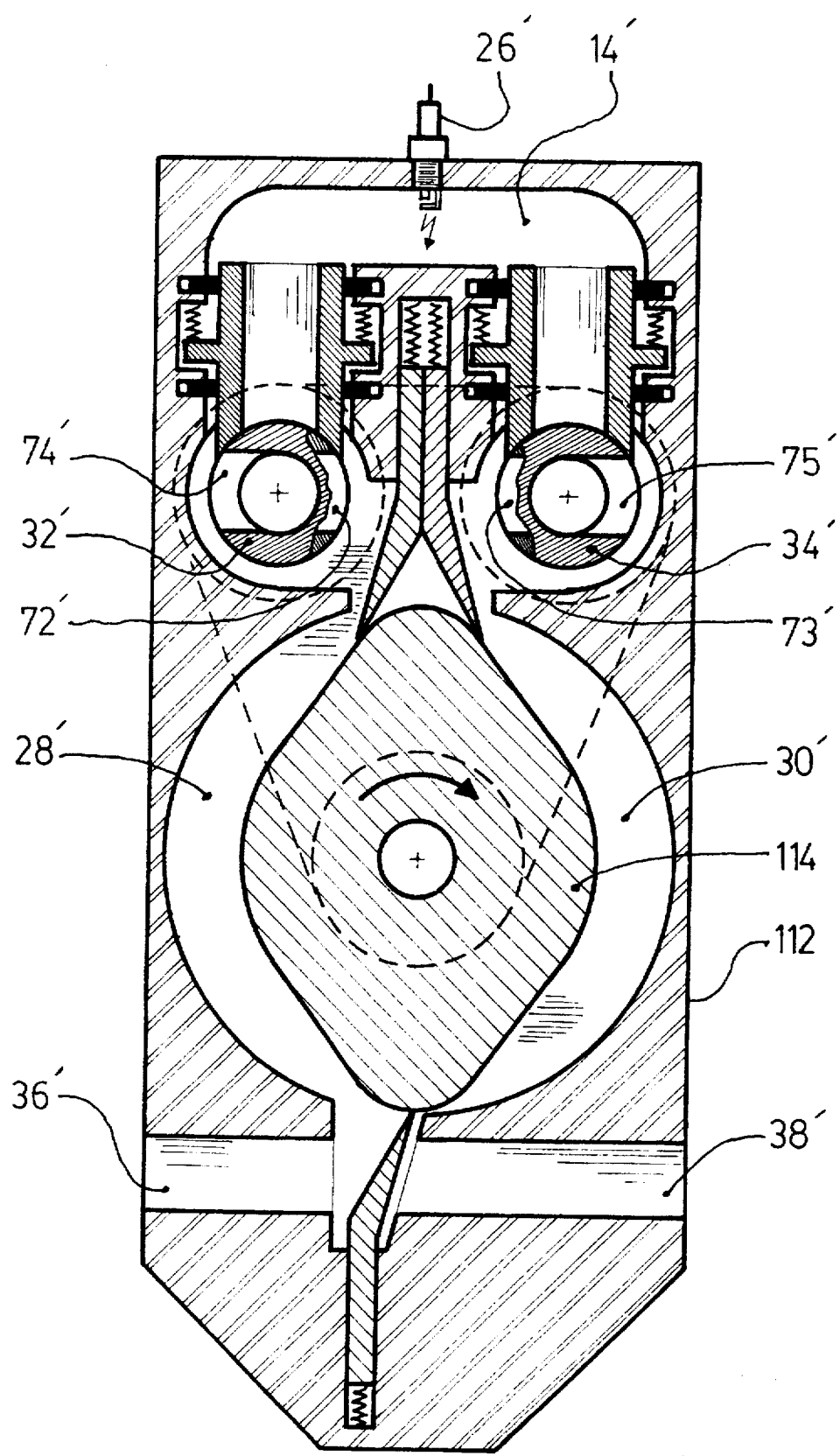
FIG. 9 is a partial sectional view similar to FIG. 8, but showing the engine advanced to the point of ignition in the combustion chamber shown in FIG. 8.
Figure 10:
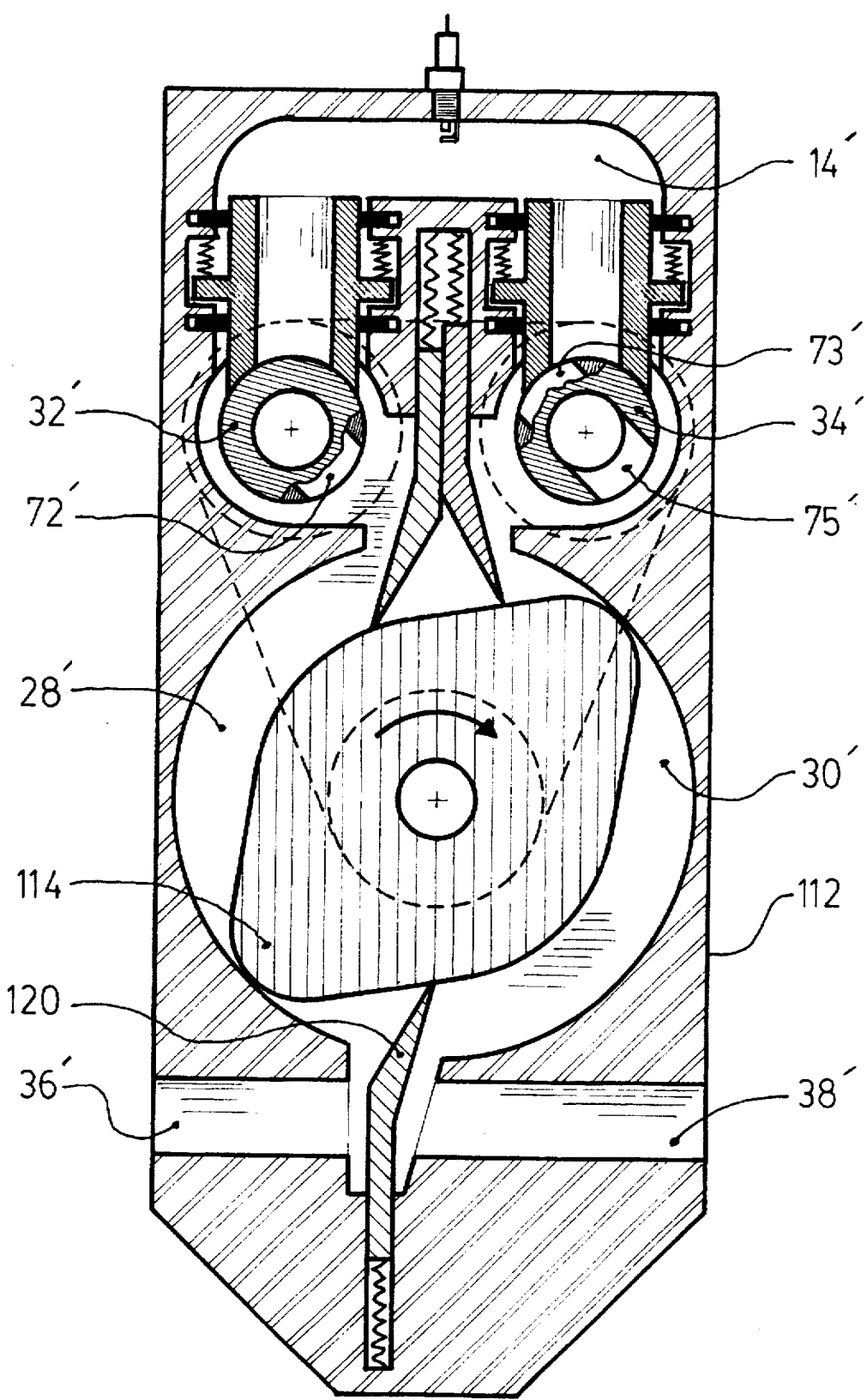
FIG. 10 is a partial sectional view similar to FIGS. 8 and 9 showing the engine advanced to the expansion stage.

In operation, as rotor 114 rotates, the air/fuel mixture is drawn into intake opening 36'. As one of the lobes 126 of rotor 114 passes reciprocating seal 120 and intake opening 36', the air/fuel mixture is compressed and forced through valve member 32' to charge combustion chamber 14'. As rotor 114 reaches the top dead centre position as indicated in FIG. 9, both valve members 32' and 34' are closed and ignition occurs in combustion chamber 14'. As rotor 114 continues its rotation as indicated in FIG. 10, switching valve 34' then opens allowing the expanding gases in combustion chamber 14' to pass into expansion chamber 30' and drive rotor 114.

It will be appreciated that in both of the embodiments described above, as one of the combustion chambers is being charged or pressurized, combustion has already occurred in the other combustion chamber and the rotor is being driven by the expanding gases emerging therefrom. In other words, intake and charging of one combustion chamber is taking place simultaneously with the discharge or output of the other combustion chamber.

Having described preferred embodiments of the invention, it will be appreciated that various modifications may be made to the structures described above. For example, different types of switching valves or valve members could be employed, as well as different types of reciprocating seals. A number of units could be ganged together or coupled in parallel to increase the overall output of the rotary engine. Different types of rotors could be used than those described above. Other modifications can be made to the size or shape or configuration of the various components as will be apparent to those skilled in the art.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A rotary internal combustion engine, comprising:
a housing defining first and second spaced-apart combustion chambers, each chamber having an inlet and an outlet; ignition means communicating with each combustion chamber to ignite a compressed fluid air/fuel mixture located therein; the housing further defining cylindrical compression and expansion chambers located therein adjacent to and communicating respectively with said combustion chamber inlets and outlets; the housing further having intake and exhaust openings spaced from the combustion chamber inlets and outlets and communicating respectively with the compression and expansion chambers; oval-like rotor means axially located in the compression and expansion chambers; reciprocating sealing means mounted in the housing engaging the rotor means and located such that rotation of the rotor means permits fluid to be drawn in through the intake opening, be compressed and pass through the combustion chambers from the inlets to the outlets, and pass out through the exhaust opening; a first switching valve located in the housing in communication with the compression chamber to receive compressed fluid therefrom, said first switching valve including a cylindrical rotating cylinder having a central, S-shaped passage defining first and second, spaced-apart opposed ports, said ports being located such that upon rotation of said shaft, one of said ports intermittently communicates with the first combustion chamber and the other of said ports intermittently communicates with the second combustion chamber for delivering said compressed fluid alternatively between the first and second combustion chambers; a second switching valve mounted in the housing between the combustion chamber outlets and the expansion chamber, said second switching valve including a cylindrical rotating cylinder having a central, S-shaped passage defining first and second, spaced-apart opposed ports, said ports being located such that upon rotation of said shaft, one of said ports intermittently communicates with the first combustion chamber and the other of said ports intermittently communicates with the second combustion chamber for delivering ignited compressed fluid alternatively from the first and second combustion chamber outlets to the expansion chamber to drive the rotor means; seals located in the combustion chambers; means responsive to pressure in the combustion chambers for urging said seals into engagement with the switching valves; and timing means coupled to the first and second switching valves and the rotor means for co-ordinating the switching of said valves.

2. A rotary internal combustion engine as claimed in claim 1 wherein said compression and expansion chambers are separate, spaced-apart chambers, and wherein the rotor means includes separate rotors, one rotor being located in each said chamber.

3. A rotary internal combustion engine as claimed in claim 1 wherein said ports are located such that when one of said ports is in communication with a combustion chamber, the other of said ports is in communication with one of the compression and expansion chambers.

4. A rotary internal combustion engine as claimed in claim 3 wherein said seals are cylindrical, sliding, hollow piston, saddle seals located in the combustion chambers engaging the switching valve rotating cylinders.

5. A rotary internal combustion engine as claimed in claim 1 wherein said reciprocating sealing means include offset distal end portions engaging the rotors, said offset distal end portions being obliquely disposed such that pressure in the compression and expansion chambers urges said end portions into further engagement with the rotors.

6. A rotary internal combustion engine as claimed in claim 5 wherein at least one of said reciprocating sealing means includes back-to-back reciprocating members, the distal end portions of said reciprocating members diverging outwardly from one another.

7. A rotary internal combustion engine as claimed in claim 4 wherein the timing means includes a drive train coupled to the rotors and the switching valve rotating shafts, for rotating the rotors at twice the speed of the rotating shafts, so that as one combustion chamber is in communication with the compression chamber the other combustion chamber is in communication with the expansion chamber.

8. A rotary internal combustion engine as claimed in claim 2 wherein the volume of the compression chamber is different than the volume of the expansion chamber.

9. A rotary internal combustion engine, comprising:
a housing defining first and second spaced-apart combustion chambers, each chamber having an inlet and an outlet; ignition means communicating with each combustion chamber to ignite a compressed fluid air/fuel mixture located therein; the housing further defining a single common cylindrical compression and expansion chamber located therein adjacent to and communicating respectively with said combustion chamber inlets and outlets; the housing further having intake and exhaust openings spaced from the combustion chamber inlets and outlets and communicating respectively with the compression and expansion chamber; oval-like rotor means axially located in the compression and expansion chamber; reciprocating sealing means mounted in the housing engaging the rotor means and located such that rotation of the rotor means permits fluid to be drawn in through the intake opening, be compressed and pass through the combustion chambers from the inlets to the outlets, and pass out through the exhaust opening; a first switching valve located in the housing in communication with the compression and expansion chamber to receive compressed fluid therefrom, said first switching valve including a cylindrical rotating cylinder having a central, S-shaped passage defining first and second, spaced-apart opposed ports, said ports being located such that upon rotation of said shaft, one of said ports intermittently communicates with the first combustion chamber and the other of said ports intermittently communicates with the second combustion chamber for delivering said compressed fluid alternatively between the first and second combustion chambers; a second switching valve mounted in the housing between the combustion chamber outlets and the compression and expansion chamber, said second switching valve including a cylindrical rotating cylinder having a central, S-shaped passage defining first and second, spaced-apart opposed ports, said ports being located such that upon rotation of said shaft, one of said ports intermittently communicates with the first combustion chamber and the other of said ports intermittently communicates with the second combustion chamber for delivering ignited compressed fluid alternatively from the first and second combustion chamber outlets to the compression and expansion chamber to drive the rotor means; seals located in the combustion chambers; means responsive to pressure in the combustion chambers for urging said seals into engagement with the switching valves; timing means coupled to the first and second switching valves and the rotor means for co-ordinating the switching of said valves, and wherein the rotor means includes a double-lobed rotor dividing said compression and expansion chamber into a compression chamber portion and an expansion chamber portion.

10. A rotary internal combustion engine as claimed in claim 9 wherein the reciprocating sealing means includes a first reciprocating seal located between the combustion chamber inlet and outlet, and a second reciprocating seal located between the intake and exhaust openings.

11. A rotary internal combustion engine as claimed in claim 10 wherein the first and second switching valves include a cylindrical rotating cylinder having a central, S-shaped passage defining first and second, spaced-apart opposed ports, said ports being located such that upon rotation of said shaft, one of said ports intermittently communicates with the first combustion chamber and the other of said ports intermittently communicates with the second combustion chamber.

12. A rotary internal combustion engine as claimed in claim 11 wherein said ports are located such that when one of said ports is in communication with a combustion chamber, the other of said ports is in communication with one of the compression and expansion chambers.

13. A rotary internal combustion engine as claimed in claim 12 wherein said seals are cylindrical, sliding, hollow piston, saddle seals located in the combustion chambers engaging the switching valve rotating cylinders.

14. A rotary internal combustion engine as claimed in claim 12 wherein the timing means includes a drive train coupled to the rotors and the switching valve rotating shafts, for rotating the rotor at the same speed as the rotating shafts, so that as one combustion chamber is in communication with the compression chamber the other combustion chamber is in communication with the expansion chamber.

15. A rotary internal combustion engine comprising: a housing defining first and second combustion chambers, each chamber having an inlet and an outlet; ignition means communicating with the combustion chambers to ignite a compressed fluid air/fuel mixture located therein; the housing further defining cylindrical compression and expansion chambers located therein adjacent to and communicating respectively with said combustion chamber inlets and outlets; the housing further having intake and exhaust openings spaced from the combustion chamber inlets and outlets and communicating respectively with the compression and expansion chambers; oval-like rotor means axially located in the compression and expansion chambers; reciprocating sealing means mounted in the housing engaging the rotor means and located such that rotation of the rotor means permits fluid to be drawn in through the intake opening, be compressed, pass through the combustion chambers from the inlets to the outlets thereof, and pass out through the exhaust opening; a first valve member located in the housing between the compression chamber and the combustion chamber inlets; a second valve member located in the housing between the combustion chamber outlets and the expansion chamber; the valve members being formed with a central, S-shaped passage defining first and second spaced-apart ports, said ports being located such that upon rotation of the valve members, one of said ports intermittently communicates with the first combustion chamber and the other of said ports intermittently communicates with the second combustion chamber; hollow piston seals located in the combustion chamber engaging the first and second valve members and being urged into engagement with the valve members by pressure in the combustion chamber; and timing means coupled between the valve members and the rotor means for sequentially opening and closing the valve member upon rotation of the rotor means.

16. A rotary internal combustion engine as claimed in claim 15 wherein said valve members are in the form of rotating cylinders having transverse openings therethrough for the intermittent passage of fluid therethrough.

17. A rotary internal combustion engine as claimed in claim 16 wherein the piston seals are cylindrical, hollow saddle seals adapted to engage transversely the valve member shafts.

18. A rotary internal combustion engine as claimed in claim 15 wherein said ports are located such that when one of said ports in a valve member is in communication with a combustion chamber, the other of said ports in said valve member is in communication with one of the compression and expansion chambers.

* * * * *